(12) United States Patent  
Cohen et al.

(10) Patent No.: US 11,836,636 B2  
(45) Date of Patent: Dec. 5, 2023

(54) ESTIMATION OF CURRENT AND FUTURE MACHINE STATES

(71) Applicant: ABB Schweiz AG, Baden (CH)

(72) Inventors: Andrew Cohen, Mannheim (DE); Marcel Dix, Mannheim (DE)

(73) Assignee: ABB Schweiz AG, Baden (CH)

( * ) Notice: Subject to any disclaimer, the term of this patent is extended or adjusted under 35 U.S.C. 154(b) by 703 days.

(21) Appl. No.: 16/443,914

(22) Filed: Jun. 18, 2019

(65) Prior Publication Data

US 2019/0311273 A1 Oct. 10, 2019

Related U.S. Application Data

(63) Continuation of application No. PCT/EP2017/083818, filed on Dec. 20, 2017.

(30) Foreign Application Priority Data

Dec. 21, 2016 (EP) .................................. 16205984

(51) Int. Cl.
*G05B 19/4155* (2006.01)
*G05B 23/02* (2006.01)
*G06N 5/02* (2023.01)
*G06N 7/01* (2023.01)

(52) U.S. Cl.
CPC ........... *G06N 5/02* (2013.01); *G05B 19/4155* (2013.01); *G05B 23/0254* (2013.01); *G06N 7/01* (2023.01); *G05B 2219/33139* (2013.01)

(58) Field of Classification Search
USPC ........................................................ 700/49
See application file for complete search history.

(56) References Cited

U.S. PATENT DOCUMENTS

| | | | |
|---|---|---|---|
| 8,700,550 B1 * | 4/2014 | Bickford | G01K 15/005 706/14 |
| 9,306,962 B1 | 4/2016 | Pinto | |
| 10,296,846 B2 * | 5/2019 | Csurka | G06N 3/0454 |
| 10,614,373 B1 * | 4/2020 | Jeffery | G06N 5/04 |
| 2005/0080806 A1 * | 4/2005 | Doganata | G06F 11/0709 |
| 2006/0288260 A1 * | 12/2006 | Xiao | G05B 23/0232 714/48 |

(Continued)

FOREIGN PATENT DOCUMENTS

EP 3264338 A1 * 1/2018

*Primary Examiner* — Jason D Mitchell
(74) *Attorney, Agent, or Firm* — Leydig, Voit & Mayer, Ltd.

(57) ABSTRACT

Disclosed is a computer-implemented method for generating a prediction model. The model can be for use in processing machine event data to predict behavior of a plurality of industrial machines under supervision. The prediction model can be configured to determine current and future states of the industrial machines. The method can include: extracting event features from event codes and structuring the event features into feature vectors; and generating the prediction model by clustering the feature vectors into a plurality of vector clusters, the vector clusters being assigned to respective machine states. The prediction model can be constructed based on event data from a first industrial machine and be applied to control an operating state of a second industrial machine.

20 Claims, 8 Drawing Sheets

(56) References Cited

U.S. PATENT DOCUMENTS

| | | | |
|---|---|---|---|
| 2007/0088550 A1* | 4/2007 | Filev | G05B 23/0283 704/245 |
| 2007/0282591 A1 | 12/2007 | Peng | |
| 2007/0288419 A1* | 12/2007 | Strassner | G06N 5/02 706/55 |
| 2010/0030521 A1* | 2/2010 | Akhrarov | G06N 20/00 702/182 |
| 2010/0115341 A1* | 5/2010 | Baker | G06F 11/079 709/224 |
| 2012/0022952 A1* | 1/2012 | Cetin | G06Q 30/0241 705/14.73 |
| 2012/0101974 A1* | 4/2012 | Duan | G06N 7/005 706/52 |
| 2012/0271782 A1* | 10/2012 | Blowers | G06N 20/00 706/12 |
| 2013/0042147 A1* | 2/2013 | Tonouchi | G06F 11/0781 714/37 |
| 2013/0282336 A1* | 10/2013 | Maeda | G05B 23/02 702/184 |
| 2014/0046879 A1* | 2/2014 | Maclennan | G06Q 10/067 706/12 |
| 2014/0195184 A1* | 7/2014 | Maeda | G05B 21/02 702/85 |
| 2015/0149134 A1 | 5/2015 | Mehta et al. | |
| 2015/0186777 A1* | 7/2015 | Lecue | G06N 5/025 706/55 |
| 2015/0378807 A1* | 12/2015 | Ball | G06Q 10/067 714/47.3 |
| 2016/0078367 A1* | 3/2016 | Adjaoute | G06F 16/215 706/12 |
| 2017/0178025 A1* | 6/2017 | Thomas | H04L 63/1425 |
| 2017/0188443 A1* | 6/2017 | Nakahara | A61B 6/586 |
| 2017/0235658 A1* | 8/2017 | Hata | G06F 11/34 714/47.1 |
| 2017/0365155 A1* | 12/2017 | Borutta | G06K 9/6247 |
| 2018/0019910 A1* | 1/2018 | Tsagkaris | H04B 7/04 |
| 2018/0307212 A1* | 10/2018 | Schneider | G05B 19/418 |
| 2019/0219981 A1* | 7/2019 | Lepratti | G05B 23/0224 |
| 2020/0387131 A1* | 12/2020 | Takigawa | G06N 3/08 |

* cited by examiner

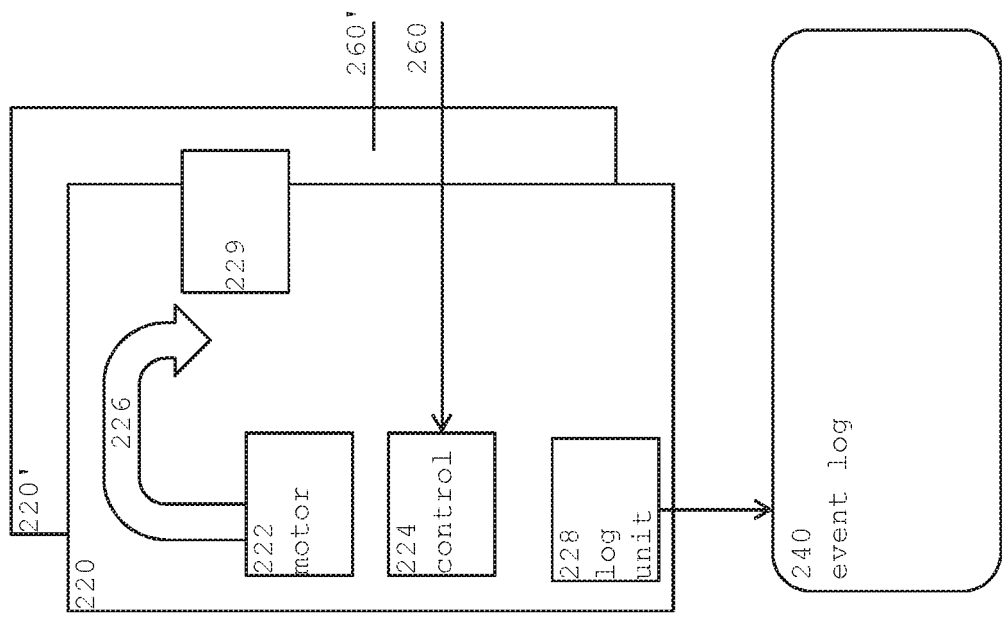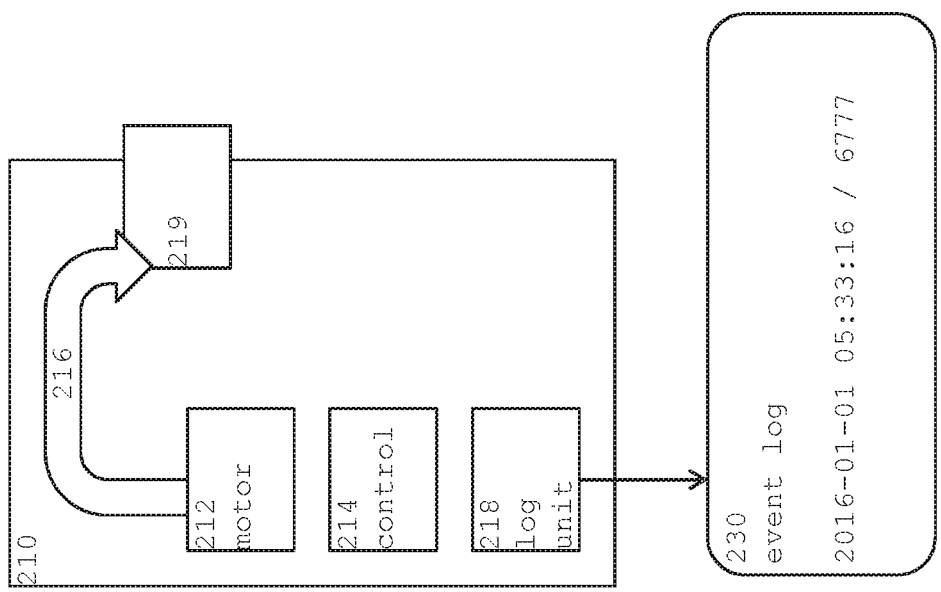
FIG. 2

| event ID | Timestamp | Event Code | Description | Severity |
| --- | --- | --- | --- | --- |
| | 431 | 432 | 433 | 434 |
| 01 | 2016-01-01 02:00:48 | 2211 | Program started | Info |
| 02 | 2016-01-01 02:01:02 | 1234 | Motor started | Info |
| 03 | 2016-01-01 02:21:09 | 1235 | Motor stopped | Info |
| 04 | 2016-01-01 02:21:10 | 2212 | Program complete | Info |
| 05 | 2016-01-01 03:00:06 | 2211 | Program started | Info |
| 06 | 2016-01-01 03:01:01 | 1234 | Motor started | Info |
| 07 | 2016-01-01 03:02:18 | 6444 | Speed overrun | Warning |
| 08 | 2016-01-01 03:14:18 | 6421 | Pos out of tol | Warning |
| 09 | 2016-01-01 03:19:26 | 6555 | Repos. successful | Info |
| 10 | 2016-01-01 03:19:26 | 1235 | Motor stopped | Info |
| 11 | 2016-01-01 03:19:26 | 2212 | Program complete | Info |
| 12 | 2016-01-01 05:28:44 | 2211 | Program started | Info |
| 13 | 2016-01-01 05:28:53 | 1234 | Motor started | Info |
| 14 | 2016-01-01 05:33:12 | 6444 | Speed overrun | Warning |
| 15 | 2016-01-01 05:33:16 | 6777 | Collision Detected | Error |
| 16 | 2016-01-01 05:33:17 | 2213 | Program suspended | Info |
| 17 | 2016-01-01 05:33:17 | 1235 | Motor stopped | Info |
| 18 | 2016-01-01 05:46:17 | 1800 | Manual mode | Info |
| 19 | 2016-01-01 06:20:55 | 6528 | Backward motion | Warning |
| 20 | 2016-01-01 06:30:38 | 2214 | Program continued | Info |
| 21 | 2016-01-01 06:30:42 | 6555 | Repos. successful | Info |
| ... | | | | |
| M-1 | 2016-06-30 04:21:09 | 1235 | Motor stopped | Info |
| M | 2016-06-30 04:21:10 | 2212 | Program complete | Info |

701 (model generation computer)

802 (behaviour prediction computer)

ESTIMATION OF CURRENT AND FUTURE MACHINE STATES

CROSS-REFERENCE TO RELATED APPLICATIONS

The present application is a continuation of International Application No. PCT/EP2017/083818 (published as WO 2018/115122 and filed on Dec. 20, 2017), both the application and the publication are hereby incorporated by reference. The International Application claims priority to European Patent Application No. EP 16205984.4 (filed on Dec. 21, 2016).

FIELD

Embodiments of the present disclosure relate to processing event data from industrial machines by computer systems, and to processing event logs and predicting the behavior of industrial machines.

BACKGROUND

Almost every industrial machine (or other industrial equipment) occasionally fails, necessitating maintenance and repair activities. A machine operator supervises the machine by monitoring the machine, by collecting and evaluating data (regarding the machine) and by interacting with the machine (e.g., to maintain or to repair it). The occurrence of machine failure can thereby be minimized. However, there are many constraints.

A first constraint relates to data quality and quantity. Machine data comes from sensors, from control units or other sources, and the data can be available in so-called event logs. The logs can be long lists with codes for critical events (such as alarms or alerts) and for non-critical events (such as code that document the operation of the machine). Potentially there are about 10,000 different codes. It is difficult, time-consuming and error-prone to decode the codes by humans.

A second constraint relates to recognition time and to reaction time. Event data can give a hint that a collision (or other unwanted event) is expected immediately, for example, between a robot machine and an item in the physical proximity of the robot. The code is not necessarily code for a critical event. There is not sufficient time for any human operator to anticipate the collision and to stop the robot in advance.

A third constraint relates to computers that assist the human operator. The computer needs to process the event data in real-time, with minimized signal propagation delays (from sensor, to the computer, to the machine) and minimized processing delays (inside the computer) so that the computer (and subsequently the human operator) can react before the error actually occurs.

A fourth constraint relates to the accuracy of data processing. For example, stopping the machine in case of incorrect data processing ("false alarms") is not desired either.

A fifth constraint relates to the availability of industrial machines for maintenance during particular times of the day (e.g., between working shifts, during scheduled breaks). In theory, an industrial machine could be switched off for maintenance at any time, but technical resources would be wasted, let alone other implications that result from the interruption.

The constraints impact efficiency and effectiveness. Supervising the industrial machines need to be improved. U.S. Pub. No. 2015/0378807 A1 to Ball et al. explain an approach to predict failures in a production process. Components of the process are identified in combination with failure events, wherein the failure events are associated with meanings, such as a running out of parts or the like. The prediction uses time-dependent variables as input.

SUMMARY

An embodiment of the present disclosure includes a computer-implemented method for generating a prediction model, the model being for use in processing machine event data generated by one or more of a plurality of industrial machines sharing common properties, the method including: receiving an event log comprising a plurality of codes representing events that occurred during operation of at least one of the industrial machines during an observation time interval, the event representations comprising respective time stamps and event codes; extracting event features from the event codes and structuring the event features into feature vectors; and generating the prediction model by clustering the feature vectors into a plurality of vector clusters, the vector clusters being assigned to respective machine states. The prediction model can be configured to receive, as an input, one or more of the event codes and to provide, as an output, one or more probabilities of the at least one industrial machine transitioning between a first of the machine states to a second of the machine states.

BRIEF DESCRIPTION OF THE DRAWINGS

Embodiments of the present invention will be described below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 illustrates an exemplary industrial machine that provides event data in the form of an event log, and illustrates an industrial machine under supervision (IMUS) that uses prediction feedback;

FIG. 4 illustrates an example for an event log, with a plurality of event representations that have elements such as time stamps and event codes;

DETAILED DESCRIPTION

According to embodiments of the present invention, the mentioned constraints are addressed by methods, computer programs and computer systems for predicting the behavior of an industrial machine under supervision (IMUS). As used herein, the prediction results in determining current and future states of the machine.

A first industrial machine provides event data to a model generation computer that generates a prediction model. The event data is historical data. A behavior prediction computer uses the model in combination with past and current data from a second machine—the IMUS—and provides feedback to the IMUS. Both the first and the second machine have common properties, therefore the prediction model is applicable to both machines, for training and for supervising. It is possible to use one and the same industrial machine for both purposes. In such a scenario, the machine operates as the first machine to provide the historical data and subsequently (when a model has been generated at least initially), the machines operates as the second machine, the IMUS.

Generating the prediction model comprises to obtain event features and event vectors, to cluster the vectors and to assign clusters to machine states, and to identify probabilities of machine state transitions. Features, vectors and clusters are processed by techniques, wherein some of the techniques are natural language processing (NLP) techniques. The prediction model is adapted to receive event representations (of the IMUS) as input and to provide transition probabilities as output. Optionally is the provision of feedback to the IMUS. While the prediction model is semantic-agnostic, adding semantics during interactions with expert and operator users enhances the model. The enhanced model provides feedback to the IMUS as control signals. Using the model to predict the behavior of the IMUS is optimized for short processing times. As a consequence, efficiency and effectiveness are increased.

A method for predicting the behavior of the IMUS has two complementary sub-methods: generating the prediction model, and predicting the behavior of the IMUS. The sub-methods use event data from the machines: historical data to generate the prediction model and past/current data to be processed by the prediction model.

Overview

Figure 1:
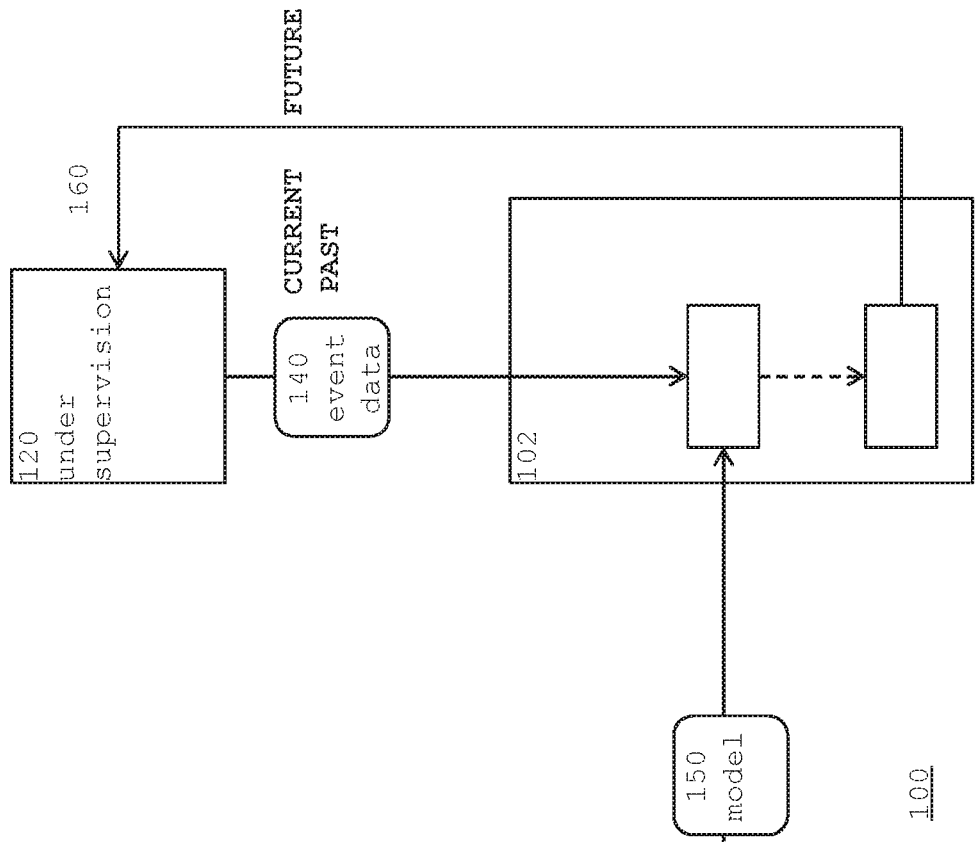
FIG. 1 illustrates an overview of an exemplary computer-implemented approach to predict the behavior of industrial machines.

FIG. 1 illustrates an overview of a computer-implemented approach to predict the behavior of industrial machines. The term "behavior" stands for a sequence of technical states of an industrial machine during its operation. As illustrated from left to right, there are two industrial machines and two computer activities. Industrial machine 110 is the historical data provider machine (or training machine), and industrial machine 120 is the machine under supervision that benefits from the prediction. Computer activity I is a model generation activity that observes event data 130 (event representations) from industrial machine 110 and that results in prediction model 150. Event data 130 is historical data in the sense that it is available prior to the model generation activity. Computer activity II is the behavior prediction activity that uses prediction model 150 in combination with event data 140 from machine 120 and that—optionally—provides feedback 160 to industrial machine 120. Feedback 160 can be a control signal that interferes with the operation of industrial machine 120. Feedback 160 can also result in an interaction of a user with the IMUS in response to the prediction results (with current and future states of the IMUS).

As explained with more detail below, the event data has some constraints (e.g., data amount and timing inconsistencies) so that event data alone is not suitable for prediction. Using prediction model 150 overcomes these and other constraints.

Description and drawings refer to single machines, but the approach can also be applied to a combination of machines. For example, machines can cooperate in a particular industrial process: machine A can grasp a piece of material, machine B can process that piece, machine C can clean it and so on. Machines A, B and C can be located within a so-called machine cell. For safety and other reasons, if one machine in the cell is being stopped, the other machines are being stopped automatically. The combination ABC of machines A, B and C can be regarded as a single machine.

Likewise, the approach can also be applied to components of the machines, for example, to the motors only. Particular components can be treated as machines 110 and 120 so that the prediction relates to the components.

Industrial machines 110 and 120 have common properties:
  a) The machines have (at least) a common set of events that can occur.
  b) The machines have (at least some) common components (e.g., motors of similar type), or the machines are of similar type (e.g., both are industrial robots from the same manufacturer).
  c) The common events relate to the common components. As a consequence, both industrial machines, i.e. historical data provider machine 110 and machine 120 under supervision show similar behavior.

For example, if both machines 110 and 120 have direct current (DC) motors as components, some events are typical for DC-motors, among them failure of the commutator brushes. The event "brush failure" is a common event that relates to the common component DC motor. On the other hand, if machine 110 would use a DC-motor, but machine 120 an AC-motor, the components are different. A DC-motor-only event (e.g., the brush failure) would have no influence to AC-motors. There would be no common events relating to common components. In other words, both machines 110 and 120 need to comply with the conditions, otherwise, such events can not contribute to the model.

This example is simplified. For non-compliance with a condition, the model would be inaccurate with regards to that condition. As a consequence, the prediction might become inaccurate. For example, applying the model of the machine with DC motor to a machine with AC motor (as IMUS) may result in states (and/or state transitions) that would not correspond to reality of the IMUS. However, tolerance is available. In the example, the AC motor may never enter states which would occur prior to a DC motor failure (or other) event.

For convenience of explanation, the activities are illustrated and described separately as if the computer activities are performed at consecutive phases. The person of skill in the art understands that—in real implementations—both computer activities can be performed substantially at the same time. As soon as an initial prediction model becomes available (i.e. resulting from activity I), prediction (i.e. activity II) can start. But model generation (activity I) continues so that over time the initial prediction model turns into a more accurate prediction model (i.e. to a model that becomes more and more responsive to the constraints).

The separation by the illustration and the description is convenient, but one and the same machine can provide the historical data and subsequently turn into the IMUS.

Figure 3:
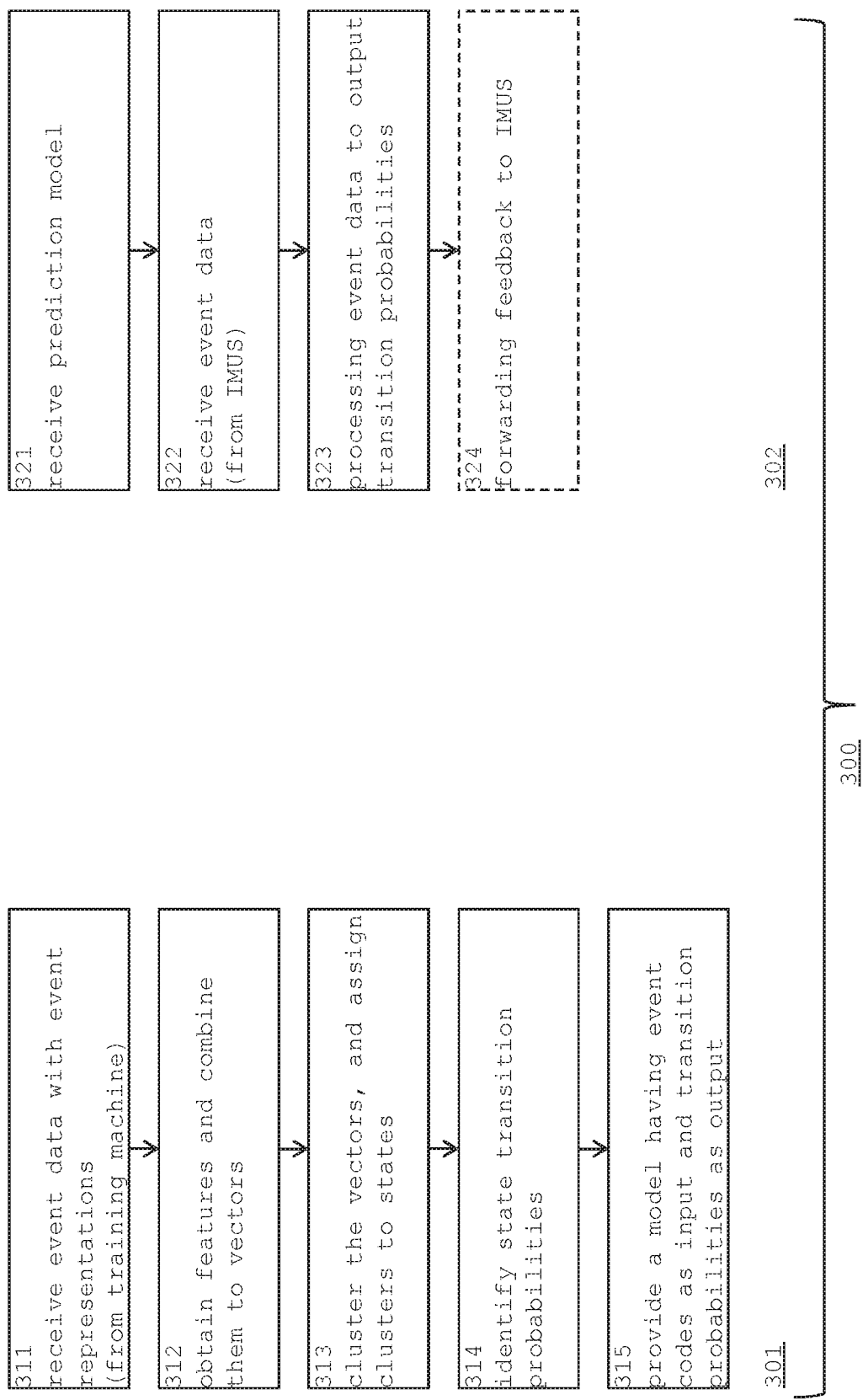
FIG. 3 illustrates an exemplary method for predicting the behavior of an industrial machine, with a method for generating a prediction model and a method for predicting behavior.

Both activities are described as computer-implemented methods: a method for generating a prediction model (cf. FIG. 3, 301) and a method for predicting the behavior (cf. FIG. 3, 302). Accordingly, there is model generation computer 101 and behavior prediction computer 102. The combination of both computers 101 and 102 is referred to as computer system 100.

The methods can be performed by the same computer system. In such a scenario, computer system 100 can be implemented as a single computer system.

Implementations for use for real industrial sites may use separate computer systems. Model generation computer 101 can be implemented by a computer that is remotely located to the industrial machines, for example by a computer in a server farm (e.g., "computer cloud", model generation being software as a service (SaaS)) that receives data from machine 110 via a wide area network (e.g., via the Internet). Behavior prediction computer 102 can be implemented on the industrial site so that signal propagation delays from an event log unit in machine 120 to computer 102 are minimized. The person of skill in the art can select the computers according to computational capabilities. It is noted that the division of concern (training vs. operation) can save computational resources because prediction computer 102 does not need the resources for training.

Model generation can also be described as computer (or computer system) in training mode (i.e. computer 101). Once a model is initially generated, it can be trained (by using historical data, from machine 110, but from machine 120 as well). Behavior prediction can also be described as operational mode (because industrial machines are being operated, i.e. computer 102).

Regarding the real-time connection of the computers to industrial machine 120, the modes can be considered as "an offline mode" (no connection during training), and an "online mode" (connection to provide the feedback, while in operation mode). Accordingly, event data 130 can be considered as being "static" (no change during training expected), and event data 140 can be considered as being "dynamic" (usually, new event representations arriving all the time).

As used here, the term "historical" refers to the time prior to performing model generating (in computer 101), for example, event data 130 is historical data.

As used herein, "past", "current" and "future", are used in relation to any given point in time (time stamp, computer system time) during the operation of behavior prediction computer 102. Machine 120 provides data as event data 140 (being data of the past, the time stamps are prior to the system time). Computer 102 derives machine states (S1, S2 etc.) for machine 120, being past states (because the time of occurrence of the state is prior to the system time). Computer 102 also derives a current state that is the state of machine 120 as represented in computer 102 at system time. Computer 102 also derives one or more future states, with the "future" starting at system time and extending into a time period of interest (T INT). The processing time it takes to derive the current/future states and to optionally derive the feedback to machine 120 (the calculation time) needs to be minimized. That is achieved by using the model. In other words, the calculation is performed in real-time (so that calculation results become available early: at system time or before T INT ends at the latest). Prediction model 150 is optimized for quick access by computer 102 (e.g. by using look-up tables that return the state(s) for particular event data). The time interval it takes computer 102 to derive the current/future states can be neglected.

The period of interest is related to the need of feedback 160 and to the availability of feedback 160. Both the calculation time and the period of interest T INT are such that the feedback to machine 120 can take effect so that consequences (risks) for the operation of the machine are minimized. Examples can be related to the above aspects. An emergency stop has to be performed immediately, so that the period is very short. A feedback that maintenance can wait until the scheduled machine stop is valuable as well; in the case the period is longer.

Model generation computer 101 has modules to perform the method, the modules comprises modules for processing, by a first group and by a second group of technologies.

Semantics of Events and States

Events, states and the feedback can have a semantic meaning which is related to the technical state of the industrial machines. It is an advantage that the approach by the present invention is semantic agnostic. Semantic meaning can be added by interaction with a human user at substantially any point in time.

The semantic meaning is explained by example: The human operator of the industrial machine is interested in preventing machine failure or the like. A control signal (or a warning signal) that is presented to the user prior to a predicted event (e.g., the mentioned collision) helps to avoid the damage. In this is case, the user can still instruct the machine to an emergency stop. This could be automated as well.

In other words, the feedback can have an effect on the future, but the control signal needs to be applied to the machine in a particular machine-specific format with appropriate meaning (e.g., to let the machine stop).

Machine Example

FIG. 2 illustrates industrial machine 210 (cf. machine 110 in FIG. 1) that provides event data 130 as event log 230, and illustrates industrial machine 220 (under supervision, cf. IMUS 120 in FIG. 1) that uses prediction feedback 260 (cf. 160 in FIG. 1).

By way of example, industrial machine 210 is described as an industrial robot (or "robot cell") with motor 212, control unit 214 (running a control program with control instructions), robot manipulator 216 and event log unit 218 (that outputs event log 230). Industrial machine 220 has similar components: motor 222, control unit 224, and robot manipulator 226. Event logging is usually provided as well (log unit 228 and log 240).

Actual events are, for example, starting the control program, starting the motor, stopping the motor, detecting a technical parameters that exceeds a threshold (e.g., speed overrun of motor 212 or of manipulator 216), moving manipulator in a particular direction (forward motion, backward motion).

Event log unit 218 provides event log 230 in that each event is represented by a time stamp (for a particular time point) and by an event code.

Providing event logs is a standard function of modern industrial machines. The event codes represent details for an event. As used herein, the event codes are strings (with, for example, 4 numerical characters). Other conventions (e.g., strings with other numbers of numerical characters, alphanumerical characters) can be used as well. The codes can be treated as words in natural language. Natural languages processing and sequence mining are therefore suitable techniques for processing the event log, but other techniques can be used as well.

The time stamps are given, for example as yyyy (year), mm (month), dd (day), hh (hour) and so on.

For example, control unit 214 started the execution of the control program at Jan. 1, 2016 at 2 o'clock in the morning, the representation for this event is 2016-01-01 02:00:48/2211

Actual events have un-equal importance, some events (e.g., start/stop) belong to a normal operation of the machine. But some other actual events put the operation of industrial machine 110 at risk and need to be avoided from occurring again. Or—at least—the frequency of occurrence should be minimized.

To illustrate such a to-be-avoided event, FIG. 2 also shows item 219 that can belong to the robot or can be positioned within reach of manipulator 216. Item 219 can be, for example, a box with material, a safety fence, the ground floor, or any other physical object. In the example, the event "collision" occurs when manipulator 216 touches item 219, in the event log 230 this is documented, for example as: 2016-01-01 05:33:16/6777

The log indicates the time point of detecting the event, but signal propagation time (from the event to its documentation) is disregarded for simplicity.

In industrial machine 220, manipulator 226 does not reach item 229 because feedback 260 (from computer 102, cf. FIG. 1) to control unit 224 has prevented this. Other industrial machines (such as machine 220' receiving feedback 260') can benefit from the same model (scaling effects).

Predicting events and especially predicting to-be-avoided events is therefore desired. As predicting takes time, there is a need to shorten the prediction time. However, inspecting event logs by human operators takes much time. Also, it is difficult for a human operator to predict events from looking at the codes. The description now focuses on the computer-supported prediction by explaining the prediction model.

Method

FIG. 3 illustrates method 300 for predicting the behavior of an industrial machine, with method 301 for generating a prediction model (left side) and method 302 for predicting behavior (right side).

(left side) Computer-implemented method 301 is a method for generating prediction model 150 (for use in processing machine-event-data) to predict the behavior of IMUS 120 with determining current and future states.

In step receiving 311, computer 101 receives event log 230 with a plurality of event representations 430 of particular events that occurred during the operation of a particular industrial machine 110/210 during an observation time interval T. Particular industrial machine 110/210 and IMUS 120 have common properties. Event representations 430 comprise time stamps 431 and event codes 432.

In step obtaining 312, computer 101 obtains event features Fn from event representations 430 and combines the features into feature vectors. Thereby, computer 101 uses techniques of a first group.

In step clustering 313, computer clusters the feature vectors to a plurality of vector clusters by using techniques of a second group. Thereby, computer 101 assigns vector clusters to machine states.

In step identifying 314, computer 101 identifies state transition probabilities P between the machine states.

In step providing 315, computer 101 provides prediction model 150. The model is adapted to receive event representations 430 as input from IMUS 120 and is adapted to provide state transition probabilities P as output, to IMUS 120.

Optionally, in step receiving 311 the event log, computer 101 receives the plurality of events representations with the event codes 432 that are strings with characters.

Optionally, in step obtaining 312 event features from the event representations 430 (and combining the features into feature vectors), the features describe at least one of the following:

the frequency of an event with a particular event code that occurs multiple times during the observation time interval, the occurrence of a first event being represented by a first code and of a second event being represented by a second code, within a pre-defined time slot between the events, within the observation time interval, and the occurrence of a first event and of a second event with a predefined maximum number of events that occur between the first event and the second event.

Optionally, in the step obtaining 312 event features (Fn) (from the event representations 430 and combining the features into feature vectors), computer 101 determines and combines the features by using techniques of the first group that comprises any of the following:

the skip-gram method, the continuous bag of words method, by topic modelling, and detecting pairwise co-occurrence of event codes within pre-defined time intervals.

Optionally, in step clustering 313 (the feature vectors to a plurality of vector clusters), computer 101 uses techniques of the second group that comprises any of the following: k-means, fuzzy c-means, expectation-maximization clustering, affinity-propagation, a density based algorithm being DBScan or being maximum-margin Clustering.

Figure 7:
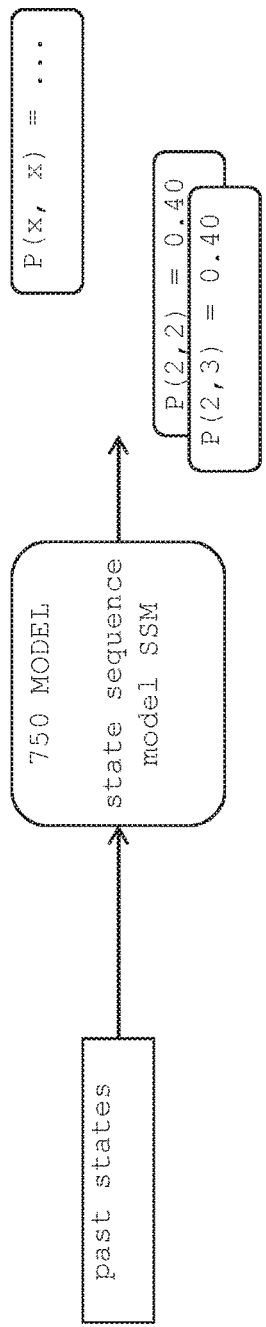
FIG. 7 illustrates the exemplary prediction model in a second granularity.

Optionally, in step identifying 314 (state transition probabilities P between the machine states), computer 101 provides a result as state sequence model that is part of the prediction model 150 (cf. FIG. 7).

Optionally, in step providing 315 (prediction model having event codes as input and having state transition probabilities as output), computer 101 interacts with an expert human user for receiving a semantic meaning in relation to event codes and to machine states.

(right side) Computer-implemented method 302 is a method for predicting the behavior of IMUS 120. In step receiving 321, computer 102 receives prediction model 150 previously generated from event data 130 from industrial machine 110 that has common properties to IMUS 120. Prediction model 150 has been generated by using techniques of a first group and of a second group. (Prediction model 150 is a model generated according to method 301.) In step receiving 322, computer 102 receives current and past event data (log 140) that has event representations 430 from IMUS 120. In step processing 323, computer 102 processes event representations 430 as input to prediction model 150 and outputs the transition probabilities for states of IMUS 120.

There are further—optional—steps of forwarding 324 feedback 160/260 to IMUS 120, and for interacting with expert human user 991 (interacting with operator human user 992, or with a user in general) to relate feedback 160/260 to a control signal for interfering with the operation of IMUS 120.

(Looking at both sides of the figure) There is a computer-implemented method 300 for predicting the behavior of IMUS 120. First, the computer (e.g., computer 101) performs method 301. Second, the computer (e.g., computer 102) performs the method 302.

Computer-implemented method 300 for predicting the behavior of IMUS 120, is a method with generating 301 a prediction model 150 (by receiving historical event data with event representations of events from a particular industrial machine that has common properties with the IMUS, by obtaining event features and event vectors, by clustering the vectors to assign clusters to states, by identifying state transition probabilities, and by providing the prediction model having event codes as input and transition probabilities as output; and predicting 302 the behavior of the IMUS by using the prediction model with current and past event data having event representations from the IMUS as the input, and by outputting transition probabilities for states of the IMUS.

FIG. 3 also illustrates a computer program or a computer program product. The computer program product—when loaded into a memory of a computer and being executed by at least one processor of the computer—performs the steps of the computer-implemented method. In other words, the blocks in FIG. 3 illustrate method 301 and 302.

Events and Features

FIG. 4 illustrates an example for event log 430 (cf. 130/230), with a plurality of event representations 431/432 (i.e., having the elements time stamp 431 and event code 432). Event log belongs to machine 110/210 (cf. left side). The figure shows column labels, but in real implementations, the labels are not required. As illustrated dashed, event log 430 can also be enhanced by indicating event description 433 and severity level 434. Such an indication is convenient for explanation, but not necessarily used by computer 101. In the example, severity level is a given by 3 level values (information, warning, error).

For convenience of explanation, the time stamps are also given here by an event-ID, from event 01 to event M (index m). In the example, the time stamps are provided at the granularity of a second. However, there can be more than one event representation 431/432 for a particular second. For example, events 09, 10 and 11 share the same time stamp. As a consequence, the sequence by that the events are represented can be different from the sequence by that the event actually occurred.

Event log 430 gives event representations for events during an observation time interval T.

As used herein, uppercase T indicates a duration or time interval, given in hours, minutes and seconds (hh mm ss). This is simplified: units for larger duration (days DD, months MM, years YY, YYYY etc.) or shorter duration (fractions of a second) could also be coded. In the example of FIG. 4, the observation time interval T for event log 430 is approximately 6 months.

It is possible to provide event logs at different time duration granularities. An event log over the total observation time interval T can be split into a plurality of event logs of partial intervals (T1+T2+T3 ... <=T). If machine 110 is not active, logging events can be interrupted. Using fixed rules is also possible (e.g., equal duration of T1, T2, T3 etc.).

For convenience of explanation, it will be assumed that one particular event log 430 (observation time interval T) leads to one particular model. As mentioned above, initial models can be enhanced. That corresponds to the use of further event logs (beyond T).

Since in industrial machines, the events occur at different locations, event occurrence and time stamps can be different. Timing inconsistencies should not be neglected. For example, it can happen that the earlier occurring event is represented by a later time stamp, and the later occurring event is represented by an earlier time stamp. Events have durations (that can be longer than time stamp granularity) and the durations can be different. As a consequence, event m−1 can NOT be regarded as predecessor event to event m in all cases. This has consequences for evaluating the events and for identifying feedback 160 (cf. FIG. 1), but the feature approach (cf. FIG. 5) is robust to such inconsistencies.

For example, a rule could be established to switch off machine 120 (being feedback 160/260) upon detecting code 6777 for event m and code 2213 for event m+1. However, such a rule would not be reliable, at least for some reasons, such as: (i) both codes can be represented in reverse order 2213 for m and 6777 for m+1 (ii) other event representations can be found between 6777 and 2213.

Generating prediction model 150 is indifferent to such potential inconsistencies. The prediction model 150 is not generated at the event granularity alone, but also being generated with features that up-scale to state granularity. As mentioned above, computer 101 receives event data 130 and represents event features by vectors. The description now looks at event features Fn (F1 to FN) that can be obtained from event log 430 (i.e. from the event representations in the log).

The person of skill in the art can use standard approaches. Techniques for processing features and vectors are also known from natural language processing (NLP) and can be used here. The following summarizes a first group of techniques that can be used alone or in combination, among them the following:

(a) the skip-gram method, being a NLP-technique (explained in: Guthrie, David, et al. "A closer look at skip-gram modelling." Proceedings of the 5th international Conference on Language Resources and Evaluation (LREC-2006). 2006.)

(b) the continuous bag of words method, also being a NLP-technique (explained in Tomas Mikolov, Kai Chen, Greg Corrado, and Jeffrey Dean. "Efficient estimation of word representations in vector space." ICLR Workshop, (2013) and Tomas Mikolov, Ilya Sutskever, Kai Chen, Greg S. Corrado, and Jeff Dean. "Distributed representations of words and phrases and their compositionality." In Advances in neural information processing systems, pp. 3111-3119. 2013.)

(c) topic modelling (explained in Wallach, Hanna M. "Topic modeling: beyond bag-of-words." In Proceedings of the 23rd international conference on Machine learning, pp. 977-984. ACM, 2006.)

(d) the detection of pairwise co-occurrence of event codes within pre-defined time intervals.

The accuracy of prediction model 150 increases with the length of the observation time interval T. For use with industrial machines, T has an order of magnitude of weeks or month. The description refers to the examples of events 01 to 21 that occur within the first six hours of the six month observation time interval T.

Features Fn have feature values that are given in the notation

F(n, code)

with n being an feature index and "code" standing for a particular event code. It is also possible to define features for particular events (noted, for example as a(n, m)).

The description explains 3 features that are much simplified.

Feature 1 relates to the number of occurrences of equally coded events. In other words, feature 1 relates to the frequency of each event code in the log history. In the example, events 01, 05 and 12 are coded as "2211", resulting in the following feature values:

a(1,2211)=3, a(1,2211)=3, a(1,2211)=3

Events 07 and 14 are coded "6444", resulting in the following feature values:

a(1,6444)=2, a(1,6444)=2

Principally, every event (within T) can be associated with a value for this feature. Again, this example is simplified, over T the numbers are higher (order of magnitude: 180*4=720).

Feature 2 relates to the co-occurrence of event codes with (all) other event codes. In an illustrative example, feature 2 is explained with the time stamps of first event (with a particular first code) and second events (with a particular second code). There is an interval between both time stamps. For example, the first code is "2211" and the second code is "1234".

from events 01 to 02 the time slot is 00:00:14
from events 05 to 06 the time slot is 00:00:55
from events 12 to 13 the time slot is 00:00:09
The feature value (here in relation to events) are:
a(1,01)=00:00:14, a(1,05)=00:00:55, a(1,12)=00:00:09

Feature values can be further processed, for example, by averaging, or by setting up the median.

Feature 3 relates to one of the above mentioned standard approaches. Other features can relate event codes to the periodic re-occurrence of time stamps, for example, by identifying the occurrence probability of events over the time of the day (e.g., event histogram). There are up to N features for each particular event code (or, for events).

Figure 5:
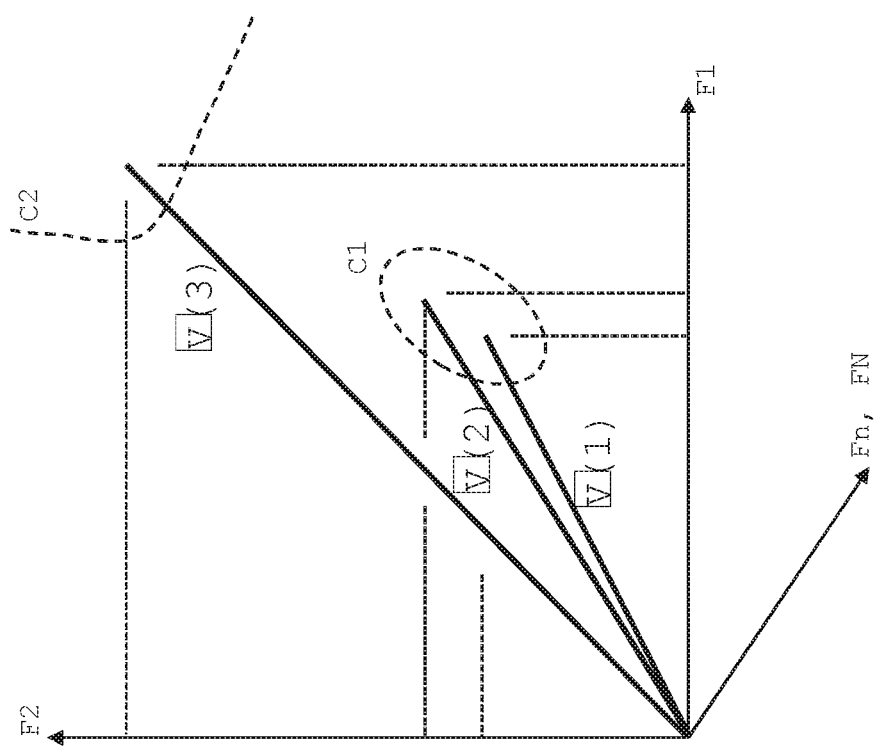
FIG. 5 illustrates an exemplary simplified coordinate diagram in that vectors represent event features.

FIG. 5 illustrates a simplified multi-dimensional coordinate diagram in that vectors V represent event features. The event features can belong to particular events (e.g., actual event 01 with code 2211), or can belong to particular event codes (e.g., code 2211, but not related to a particular event having that code). Simplified, the vectors are illustrated by numbers in parenthesis V(1), V(2), and V(3).

To simplify the illustration, a coordinate diagram has two dimensions only, corresponding to features F1 (horizontal) and F2 (vertical). Vector coordinates correspond to the feature values; there are numerical values for feature F1 and for feature F2. In other words, the feature values in combination can be regarded as vector V, as illustrated as vector V(1), V(2) and (V(3)).

While two-dimensional vectors can easily be illustrated (as in FIG. 5, e.g., from the parenthesis to the coordinate origin), it is noted that a "vector" and its graphical presentation is just convenient for illustration. As there are N features F1 . . . Fn . . . FN, there are N dimensions (also called "N-dimensional space") and data structures with features. The multi-dimensionality is just symbolized by a further coordinate axis Fn.

Vectors V(1) and V(2) are illustrated in proximity, and vector V(3) is illustrated in a distance. This is indicative of a state (or status) of machine. Events such as "program started" and "motor started" are indicative of normal operation, and events such as "collision detected" and "program suspended" are indicative of a failure.

However, there is no need for adding semantic meaning at this point. The association of events/codes to machine states is performed by clustering. Computer 101 (cf. FIG. 1) associates the vectors to clusters that are illustrated by dashed area symbols. Cluster C1 comprises V(1) and V(2) and cluster C2 comprises V(3). In other words, the mentioned data structures (i.e. the vectors) are aggregated.

Clustering techniques are available to the person of skill in the art. Clustering techniques and other techniques for the same purpose (e.g., unsupervised learning) are known and can be used here. The following summarizes a second group of techniques that can be used alone or in combination: Suitable clustering approaches that group events or codes on their proximity in an N-dimensional space are explained, for example by: Rasmussen, Edie M. "Clustering Algorithms." Information retrieval: data structures & algorithms 419 (1992): 442. More in detail, further approaches are:

(a) K-means (explained in: Kanungo, Tapas, et al. "An efficient k-means clustering algorithm: Analysis and implementation." IEEE transactions on pattern analysis and machine intelligence 24.7 (2002): 881-892.)

(b) fuzzy c-means (explained in: James C. Bezdek, Robert Ehrlich, and William Full. "FCM: The fuzzy c-means clustering algorithm." Computers & Geosciences 10.2-3 (1984): 191-203.)

(c) EM Clustering (explained in: Bradley, Paul S., Usama Fayyad, and Cory Reina. Scaling EM (expectation-maximization) clustering to large databases. Redmond: Technical Report MSR-TR-98-35, Microsoft Research, 1998.)

(d) Affinity-Propagation (explained in: Delbert Dueck. Affinity propagation: clustering data by passing messages. Diss. University of Toronto, 2009.)

(e) a density based algorithm like DBScan (explained in Thanh N Tran, Klaudia Drab, and Michal Daszykowski. "Revised DBSCAN algorithm to cluster data with dense adjacent clusters." Chemometrics and Intelligent Laboratory Systems 120 (2013): 92-96.)

(f) a density based algorithm like Maximum-Margin Clustering (explained in Zhang, Kai, Ivor W. Tsang, and James T. Kwok. "Maximum margin clustering made practical." IEEE Transactions on Neural Networks 20.4 (2009): 583-596)

Clustering to Change the Granularity

Clustering changes the granularity: In the example, clustering aggregates (a number of) 13 different event codes (i.e. 1234, 1235, 1800, 2211, 2211, 2212, 2213, 2214, 6421, 6444, 6528, 6555, 6777) to 6 states. (In real implementations, there are different, higher numbers.). Clustering can be advantageous in that is reduces the complexity of technical status information shown to a human operator. As human operators need to identify critical (pre-failure) states of industrial machines within short time, presenting states (instead of event codes) can be advantageous, for example, by reducing the likelihood of human errors.

In other words, clustering changes low-level event codes to high-level state codes. Semantic meaning can be added as explained in connection with FIG. 8.

Figure 6:
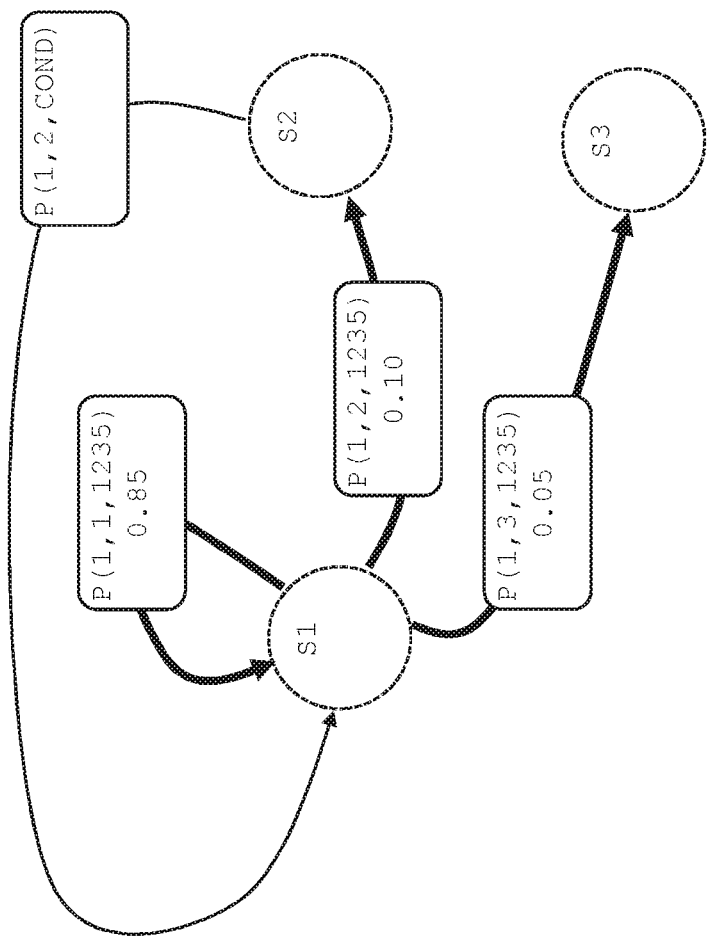
FIG. 6 illustrates an exemplary prediction model that is generated by a model generation computer, wherein the figures illustrates the model in a first granularity.
Figure 8:
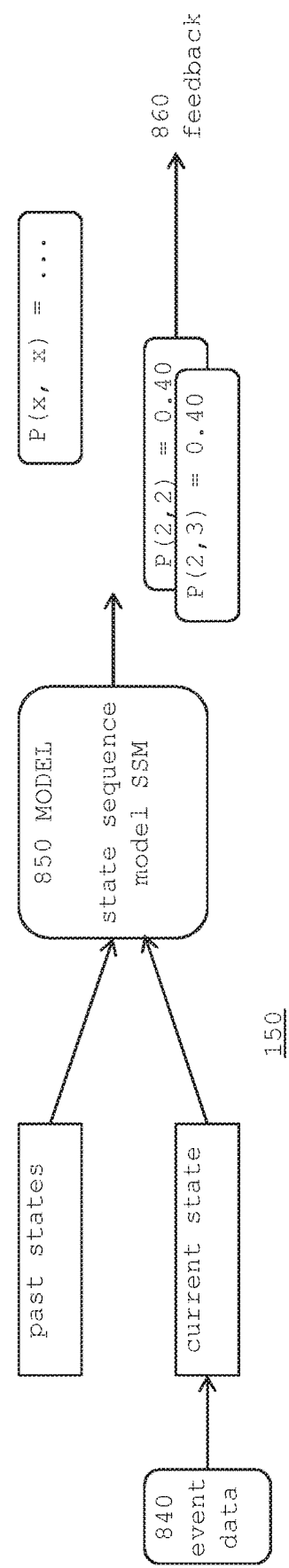
FIG. 8 illustrates the exemplary prediction model as used in operation by a behavior prediction computer.

FIGS. 6-7 illustrate model 750 that is generated by model generation computer 701 in different granularities, and FIG. 8 illustrates model 850 as used in operation by behavior prediction computer 802. In operation, model 850 enables computer 802 to provide state transition probabilities (between machine states) as output (cf. FIG. 8). System 802 predicts the behavior (here: future technical states) by providing a likelihood of entering a particular state in the future.

FIGS. 6-7 differentiate by granularity at the input: FIG. 6 concentrates on states and transition probabilities in relation to event codes, and FIG. 7 concentrates on states and transition probabilities in relation to past state and to current states.

Both figures illustrate graphs, this is convenient for explanation. Implementations use data-structures that are processed by the computers, but presenting graph to human users is not required.

As in FIG. 6, there are machine states S1, S2 and S3 that model generation computer 101 has derived from the clusters (cf. FIG. 5), for example by applying statistics. FIG. 6 uses arrows to show transition probabilities P, from a state during a first state interval to a state in a subsequent, second state interval, from "old" to "new". Bold arrows indicate the transition probability P from state S1 to state S1, from S1 to S2 and from S1 to S3, upon receiving a representation of a particular event (having particular event code "1235"). A transition can be an intra-state transition by that the new state is identical to the old state (e.g., from S1 to S1).

In the example, industrial machine 210 was in state S1 from time point 02:01:02 (cf. FIG. 4). An event occurred, and model generation computer 101 has received event code "1235". The following event occurred, at code "2212". Over the interval T, similar and different event sequences occurred, among them similar sequences (cf. 1235, 2212 at IDs 03 and 04, 10 and 11, M−1 and M); and different sequences (cf. 1235, 1800, at IDs 17 and 18). Computer 101 has identified the clusters (as described above) and has calculated transition probabilities. There is a probability (upon receiving code 1235) of 0.85 that the machine remains in state S1 (i.e. transits from S1 to S1), of 0.10 for a transition from S1 to state S2, and of 0.05 for a transition from S1 to S3.

In general notation (illustrated for a transition from S2 to S1), there are probabilities P(oldstate, newstate, condition).

In case the condition is related to an event code, there is an assignment from different event codes to different states (many-to-one).

The conditions can be defined differently. In the granularity with events as input, the conditions can be, for example:
  (i) The arrival of a particular event code (e.g., 1235 in FIG. 6) can be related to a transition to a particular state. Different codes can trigger the transition, so this is a "many-codes to one-state" assignment.
  (ii) The arrival of a sequence of two or more event codes (i.e. a plurality of event codes), with a predefined number of non-related event codes in-between (e.g., 2211 and 1234 in a sequence, with zero and a predefined number in-between) can be assigned to a transition to a particular code, as well. This is a "many-code-combinations to "one-state" assignment.
  (iii) The arrival of a sequence of two or more event codes, with a predefined time interval of non-related event codes in-between (e.g., 2211 and 1234 in a sequence, within a time interval, see above). This is again a "many-code-combinations to "one-state" assignment.

As in FIG. 7, the granularity changes. Probabilities between states (P(oldstate, newstate, condition)) can depend on conditions that are states. In other words, state transitions can depend on past and/or current states.

Past states (i.e., states and state transitions that machine 110 showed in the past, e.g., a transition from S1 to S2), and the current state (i.e. a particular state, e.g., S2) is input to a state sequence model (MSS) (being part of model 150). The model outputs the likelihood of entering a particular state in the future. This is illustrated without further conditions: P(2, 3)=0.40, P(2, 2)=0.40, P(2, 1)=0.18, P(2, 4)=0.02

This overview in FIG. 6-7 is simplified for explanation, to calculate the probabilities, persons of skill in the art can apply other technologies, for example, (a) BIDE (bi-directional extension) as explained in Wang, Jianyong, and Jiawei Han. "BIDE: Efficient mining of frequent closed sequences." Data Engineering, 2004. Proceedings. 20th International Conference on. IEEE, 2004.
(b) PrefixScan, explained in Han, Jiawei, et al. "Prefixscan: Mining sequential patterns efficiently by prefix-projected pattern growth." proceedings of the 17th international conference on data engineering. 2001.
(c) Recurrent Neural Networks, explained in Graves, Alex. "Generating sequences with recurrent neural networks." arXiv preprint arXiv:1308.0850 (2013).
(d) and others These and other technologies can be applied to train the model.

Using the Semantic

So far, FIGS. 6-7 do not yet illustrate the application of semantic for the states. The description continues with discussing the use of the prediction model and with investigating the opportunities to use semantics.

It is noted that model 150 provides states (and transition probabilities) without indicating a meaning (of a state). This has consequences for the input (i.e., event data) and for the output (i.e., the model). The events just have identifiers (in linguistics the "signifiers") in form of event codes (cf. 432 in FIG. 4), the states have identifiers as well (cf. S1, S2 etc. in FIG. 6), but the model is operative (in application to IMUS) without any association with the semantic meaning.

FIG. 8 illustrates the operation of behavior prediction computer 802. Computer 802 is communicatively coupled to industrial machine 120 (under supervision). It has received prediction model 150 (and more in particular state sequence model 850), and it continues to receive event data 840 (from IMUS 120). Computer 802 processes the event representations (similar to 430 in FIG. 4) as input to prediction model 150, derives past and current machine state and provides the transition probabilities (as feedback 860). The feedback can be enhanced to a control signal, by adding semantic. Due to the semantic, the control signal can accurately interact with the IMUS, and can even interfere with its operation (e.g., to switch IMUS off in case of immediate collision). Adding semantics also assists the human user, in shortening recognition and reaction time. The semantic also increases the processing correctness, for example, by differentiating between "false" and "correct" alarms.

Figure 9:
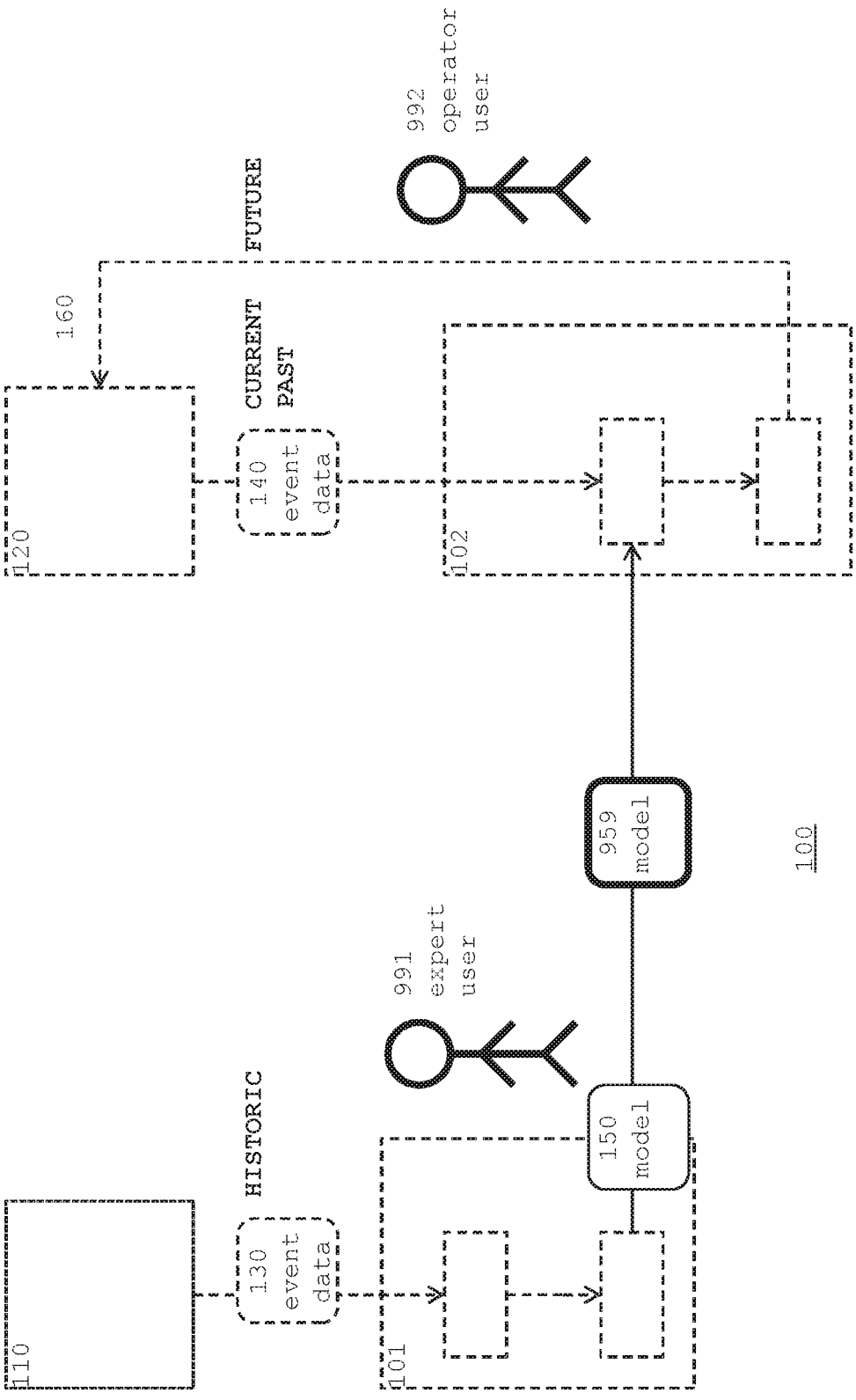
FIG. 9 illustrates exemplary interaction between human users and the computers.

FIG. 9 illustrates interaction between human users and the computers. FIG. 9 is similar to FIG. 1, and the blocks of FIG. 1 are illustrated by dashed lines. Expert user 991 interacts with computer 101 to add semantics to the states in the model. Prediction model 150 is enhanced (through interaction with user 991) by semantic descriptors to semantics-enhanced prediction model 959, such as for example: S1 is described as "normal operation of the machine", S2 as "abnormal operation of the motor or of the brakes of the (robot) machine, but not yet critical", S3 as "brake failure", S4 as "gear failure", S5 as "unplanned maintenance in mode 1", and S6 as "unplanned maintenance in mode 2".

Operator user 992 is the human operator of industrial machine 120. He or she reads information regarding the states, with/without the semantic descriptors. Computer 102 (and/or industrial machine 120) is usually equipped with appropriate user interfaces. The information can be displayed (to the user) or communicated otherwise (e.g., audio message, electronic communication to a mobile device carried by the user, short-message service SMS, email). The information can be communicated in a format that is expected by the operator user: by warning lamps, by notification lamps or the like.

The states can be current states, and future states (that result from the prediction). The information can be enhanced with pre-defined messages that help the user to interact with the machine (e.g., to slow down the machine, the let the machine pause etc.). The information can in addition (or instead of) the feedback to machine 120.

The states can be presented in combination with the transition probabilities (to/from a particular state). Degrees of severity can be linked to the probabilities.

The information that is communicated to the user(s) is used to change the state of the machine, especially to interfere with the operation of IMUS 120 to prevent failure.

Usually, both users are separate human persons, but can also be the same person. Their working times relate to the training mode (of computer 101) and to the operation mode (of computer 102).

The operation of behavior prediction computer 802 can also be explained as a basic step sequence, by the following example:
(1) Begin
(2) Continually monitor machine events in real-time (or "observing", cf. event data 840 arriving at computer 802).
(3) In case that a new event representation (cf. time stamp 431, code 432) arrives at the event log
  (3a) read the new event log
  (3b) determine the current operational state (by using the machine state model, cf. FIG. 6 that was trained previously)
  (3c) display the current operational state to a human operator, with semantic information (cf. operator user 992, FIG. 9)
  (3d) update control signals regarding the current state (e.g., signals in machine 120 or in a control center, signals that are indicative of the state)
  (3e) calculate probabilities of state transitions (using the SSM, FIG. 7, that was previously trained), for a period of interest T INT in the future
  (3f) display the future states, with semantic, including a measure of confidence
  (3g) update control signals regarding expected future states
(4) End Further Aspects Having explained embodiments, the description closes by discussing some further aspects. There is no need to identify a semantic meaning of states in advance. Model generating computer 101 provides a model with events as input and with transition probabilities as output (cf. step 315), but there is no knowledge required what states may exist in the machines (110 and 120). Knowledge is used here in the sense of the data within the computer. It is noted that "knowledge" in the sense of human understanding is also not yet required because semantic meaning is not related to model generation. Potentially, the purpose of the machine is not relevant.

Based on the events (in event data 130, that is historical data), the computer provides states and inter-state transition probabilities. Relating the states (and the transitions) to a semantic meaning is not required. The meaning of the events (in the historical data) is not a requirement for generating the model. The states (and the transitions) are generated from the event codes (that do not convey meaning). As a consequence, the interaction of the components (in machine 110) that trigger the events does not have to be considered.

When model 150 is applied to IMUS 120, computer 102 provides states and inter-state transition probabilities, but again the semantic meaning of the states and probabilities is not required. In other words, the states and transitions are mirrored from machine 110 (with historical data) to IMUS 120 (with current, past data).

There is a separation between identifiers and meaning: A particular event, such as "motor started", has an identifier, such as a number or text string, the event code "1234". In reality (i.e., in machines 110 and 120) there is a motor that starts to rotate. In linguistic terms, this corresponds to signifiers (identifier) and denotation (what the identifier stands for).

But model generating computer 101 can disregard the meaning. Model generating computer 101 provides model 150 (cf. method in FIG. 3) by looking at the identifiers only (e.g., "1234", but by disregarding the meaning of the event (the motor starting). As a result, the model provides states (and transition probabilities) that are separated from the meaning. The model would not take the properties of motors into account. However, for the application of the model (for predicting behavior of the IMUS), there is a requirement that both machines have the same semantics meaning (e.g., common components, common events). As a consequence, IMUS 120 would show a similar behavior as the training machine 110, or in other words, the states (and transitions) from event data 140 would be similar to the states (and transitions) from event data 130. Semantic meaning can be related to the states at a later point in time.

Disregarding the (semantic) meaning to generate the model (cf. left side of FIG. 1), and to apply the model (cf. right side of FIG. 1) relieves the operators (of computers 101, 102) from considering prior knowledge (of the operation of the machines). This may be an advantage over the above-mentioned reference by Ball et al.

There is an industrial machine (110 on the left side of FIG. 1) that delivers event codes (with time stamps). Model 150 is generated (with features, clusters etc.) and model 150 reflects states (and/or transition probabilities). So far, the event codes at the input are not yet associated with a meaning (or semantic). As a result, there are states (and transitions) that are not yet assigned to a meaning. The states have code words, such as "S1", "S2" and so on, but without a meaning.

A state with the meaning "normal operation" should not be converted to a control signal that switches IMUS 120 off. A state with a meaning that indicates failure, abnormal operation (or IMUS 120, or of a machine component etc.) can be converted to a control signal that changes the operation of the machine. Therefore, the code word "S1" (of a state) is assigned to the meaning "normal", the code word "S2" is assigned to "motor abnormal" etc. As explained, this is done by the human expert user, but at the end of the process.

From that perspective, assigning a meaning (to a state) can be postponed (in comparison to Ball et al). The identification of a meaning can be postponed to a point in time when event codes have been processed to states/transition in model 150. Due to the postponement, assigning a meaning can be accomplished at the granularity of the states (and/or to the transition probabilities). Due to the clustering etc. and other activities, the number of states is lower than the number of events (i.e., event meanings 433 in FIG. 4). This reduces complexity, makes errors less likely. Potentially, there are further advantages: there is even no knowledge (in the sense of meaning assignment to events) required when the model is being generated, even the details for the interoperation of the machine components are not required.

From a different perspective, there is an industrial machine (as 110 on the left side of FIG. 1) that delivers event codes (with time stamps). The model is being generated resulting in states (and transition probabilities). The states (and transitions) could be presented to a user, on a screen for example.

Then, model 150 can be applied to a second machine (i.e., the industrial machine under supervision—IMUS, the second machine could be even identical with the first machine), the machine would deliver event data 140 (codes, with time stamps). Using model 150 would result in states (and/or transition probabilities) as well. The states (and transitions) could be presented to a user as well (e.g., on a screen).

Since both machines have common components (common properties), the states/transitions would be similar. But the states do not have a meaning (the event codes at the input do not have a meaning either, even the type of machines is not yet known). So far, the screen would show picture, but interaction with the second machine is not yet possible. At this point, there may already be some benefit in that the user (i.e., operator of the machine) may get a better understanding of how the machine is actually working, without reading through event logs. This already may have (human-based) effect in assisting troubleshooting. The states (and the transition) provide an overview to the internal status of the machine (having a technical effect).

There is an underlying technical motivation, such as to avoid failure, find anomalies etc. at the IMUS. The relation between a state and a technical meaning comes at the end of the process: for example, code words "S1", "S2" etc. are assigned to typical technical situations of the machines. This is done by the expert user. In other word, the expert user can tag (i.e. identify) some states as interesting, especially in the sense that the states can be related to technical behavior of the machine.

Further, there is an assignment of a code to a meaning, for example "1234" in the meaning "motor started", but this assignment is disregarded for generating the model. The event-codes are processed as they are available, but the meaning is disregarded. It is possible, not to take the descriptions into account at all in this approach. In the description herein (cf. FIG. 4/433) the meaning is added to simplify the explanation. It is noted that these descriptors could be defined by the person who programmed machine 110 or could even be programmatically created by a human operator of machine 110. (The assignment of meanings to the codes can differ from person to person, but since the meaning-to-code assignment is disregarded, the model can be generated consistently.) There is no need to manually investigate the potentially event-meaning to state relations beforehand.

In other words, controlling a machine (for example by instructing it to stop if a failure is predicted) by using historical data can use model 150 and the transfer model 150 to a machine to be controlled (IMUS 120). As controlling requires the identification of a meaning, the identification of a meaning can be postponed to a point in time when event code have been processed to states/transition to model 150. The upfront effort of defining what errors have to be identified can potentially be avoided. The approach even allows finding errors that have not been anticipated. (Ball et al. call for prior anticipation of errors).

The states in model 150 are "meaning-less" states, but they can be enriched to "meaning-full" states. It may be advantageous that adding the meaning comes at the end (of the process) so that the generation of model 150 is machine agnostic.

In a further aspect, there is a computer-implemented method (301) for generating a prediction model (150) for use in processing machine event data to predict the behavior of industrial machines (120) under supervision The prediction comprises determining current and future states.

In a receiving step (311), the computer receives an event log (230) with event codes (432) that are associated with time stamps (431). The event codes (432) origin from particular events that occurred during the operation of a particular industrial machine (110, 210) during an observation time interval (T). The particular industrial machine (110, 210) and the industrial machines (120) under supervision have common properties. In an obtaining step (312), the computer obtains event features (Fn) from the event codes (432) and the time stamps (431) and combines the features into feature vectors (V(1), V(2), V(3)). Thereby, the computer uses processing techniques of a first group. In a clustering step (313), the computer clusters the feature vectors (V(1), V(2), V(3)) to a plurality of vector clusters (C1, C2) by using processing techniques of a second group. Thereby, the computer assigns vector clusters (C1, C2) to machine states (S1, S2, S3). In an identifying step (314), the computer identifies state transition probabilities (P) between the machine states (S1, S2, S3). In a providing step (315), the computer provides the prediction model (150, 750) adapted to receive event representations (430) as input, from industrial machine (120) under supervision, and adapted to provide state transition probabilities (P) as output, to the industrial machine (120) under supervision.

Figure 10:
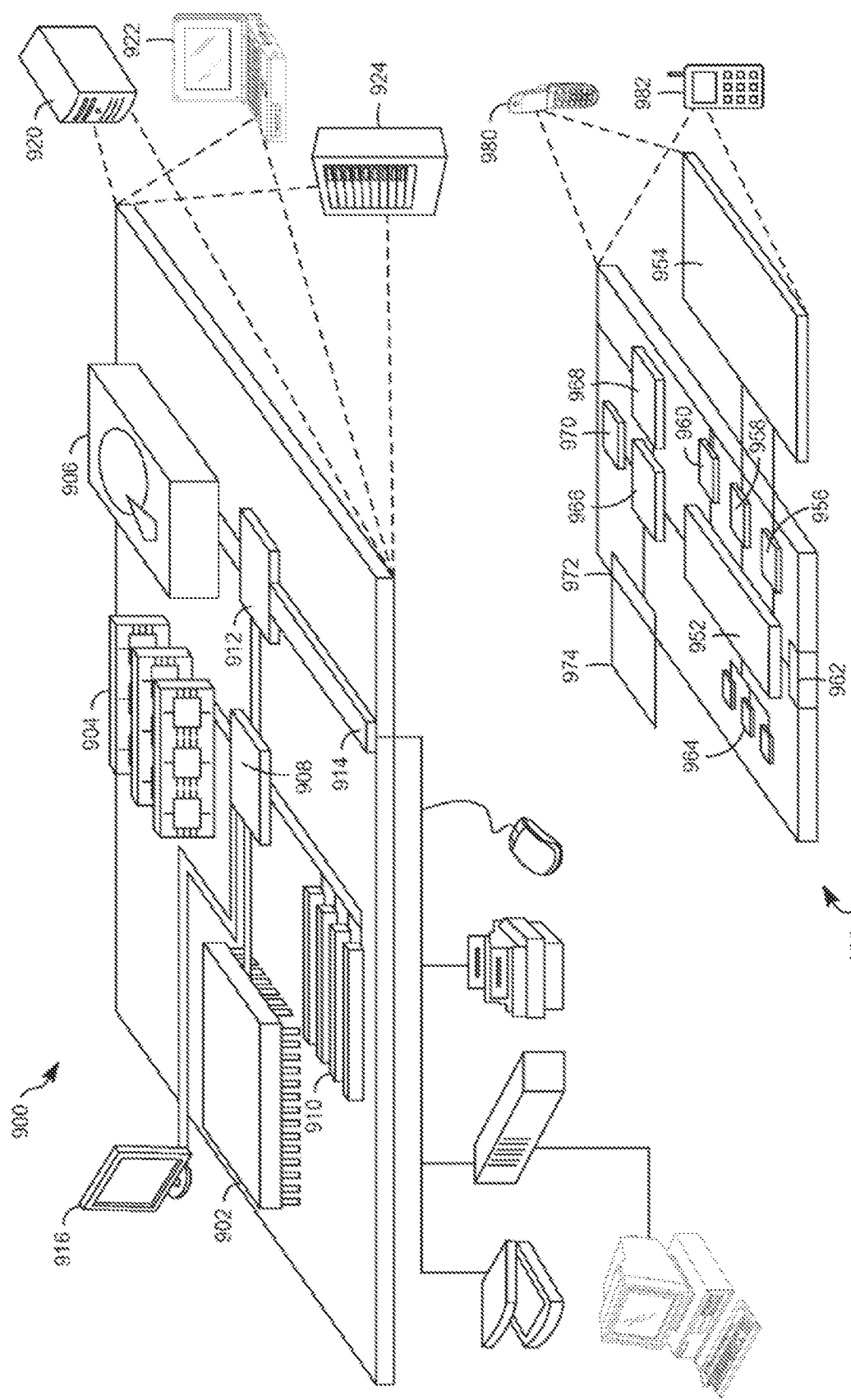
FIG. 10 illustrates an example of a generic computer device and a generic mobile computer device, which may be used with the techniques described here.

FIG. 10 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 computer system, 101 model generation computer, 102 behavior prediction computer, 110 industrial machine, 120 industrial machine (under supervision), 130 event data, 140 event data, 150 prediction model, 160 feedback, 210 industrial machine, 212 motor, 214 control unit, 216 robot manipulator, 218 event log unit, 219 item, 230 event log, 220 industrial machine, 222 motor, 224 control unit, 226 robot manipulator, 228 log unit, 229 item, 240 event log, 260 feedback, 3xx method/steps, 430 event log, 431 time stamp, 432 event code, 433 event description, 434 severity level, 701 model generation computer, 750 model (being generated), 802 behavior prediction computer, 850 model (being used), 860 feedback, 959 semantics-enhanced prediction model, 991 expert user, 992 operator user, 9xx computer components, Fn features, P probabilities, S1, S2 etc. machine states, V vectors, T observation time interval.

We claim:

1. A computer-implemented method for generating a prediction model, the model being for use in processing machine event data generated by one or more of a plurality of industrial machines sharing common properties, the method comprising:
   receiving an event log comprising a plurality of codes representing events that occurred during operation of at least one of the industrial machines during an observation time interval, the event representations comprising respective time stamps and event codes;
   extracting event features from the event codes and structuring the event features into feature vectors, wherein a first dimension of a first feature vector of the feature vectors corresponds to a first event feature of the extracted event features, and a second dimension of the first feature vector corresponds to a second event feature of the extracted event features;
   generating the prediction model by clustering the feature vectors into a plurality of vector clusters, the vector clusters being assigned to respective machine states; and
   after the prediction model has been generated, assigning a semantic meaning to at least one of the respective machine states, wherein the semantic meanings describe a meaning of the machine state;
   wherein the prediction model is configured to receive, as an input, one or more of the event codes and to provide, as an output, a control signal based on one or more probabilities of the at least one industrial machine transitioning between a first of the machine states to a second of the machine states, the control signal to influence the operation of the at least one of the industrial machines.

2. The method of claim 1, wherein the event codes comprise character strings.

3. The method of claim 2, wherein the extracted event features describe at least one of:
   a frequency of a first event associated with a first of the event codes;
   a frequency of the first event and a second event occurring within a predetermine time interval, the second event associated with a second of the event codes;
   a frequency of the first event and the second event occurring within a predetermined number of intervening event codes.

4. The method of claim 1, wherein combining the event features into feature vectors comprises one or more of the following processing techniques: a skip-gram technique, continuous bag of words processing technique, a topic modelling technique, and a pairwise co-occurrence technique.

5. The method of claim 1, wherein clustering the feature vectors comprises one or more of the following processing techniques: k-means, fuzzy c-means, expectation-maximization clustering, affinity-propagation, density based DB Scan, and density-based maximum-margin clustering.

6. The method of claim 1, wherein the prediction model comprises a state sequence model which determines:
   a current machine state and a probability of the current machine state transitioning into one of at least three known states during a finite time period of interest in the future,
   a probability of a first one of the at least three known states transitioning into a second one of the least three known states,
   a probability of an intrastate transition, wherein a previous machine state to the one of the at least three known states is identical to a subsequent machine state to the one of the at least three known states, and
wherein the method further comprises:
   after generating the state sequence model for providing the probability of the current machine state transitioning for each of the at least three known states, each known state is assigned a semantic output meaning; and
   altering the operation of the at least one of the industrial machines by the control signal using the semantic output meaning.

7. The method of claim 1, wherein the at least one industrial machine comprises a first industrial machine and the method comprises:
   receiving event codes from a second industrial machine of the plurality of industrial machines;
   inputting the event codes received from the second industrial machine into the prediction model and outputting, from the prediction model, one or more probabilities of the second industrial machine transitioning between the first and the second machine states.

8. The method of claim 7, comprising controlling a motor of the second industrial machine based on the one or more probabilities of the second industrial machine transitioning between the first and second machine states.

9. The method of claim 7, comprising controlling the second industrial machine based on the one or more probabilities of the second industrial machine transitioning between the first and second machine states.

10. The method of claim 1, wherein assigning semantic meanings to the machine states is performed by interacting with an expert human user.

11. The method of claim 1, wherein the prediction model is configured to identify state transition probabilities between the machine states.

12. The method of claim 1, further comprising:
   assigning semantic meanings to the first of the machine states and the second of the machine states; and
   interacting, based on the semantic meanings assigned to the first of the machine states and the second of the machine states, with at least one of the industrial machines using the control signal.

13. The method of claim 1, wherein extracting event features from the event codes further comprises:
   determining the first event feature based on a relation between a first event code of the event codes and either a second event code of the event codes or a different element of the received event log.

14. A computer-implemented method for predicting behavior of a first industrial machine of a plurality of industrial machines, the plurality of industrial machines sharing common properties, the method comprising:
   generating a prediction model by receiving historical event data comprising event codes from a second industrial machine of the plurality of industrial machines;
   extracting event features from the event codes and structuring the event features into feature vectors, wherein a first dimension of a first feature vector of the feature vectors corresponds to a first event feature of the extracted event features, and a second dimension of the first feature vector corresponds to a second event feature of the extracted event features;
   generating the prediction model by clustering the feature vectors into a plurality of vector clusters, the vector clusters being assigned to respective machine states;

after the prediction model has been generated, assigning a semantic meaning to at least one of the respective machine states with an interaction of a human user;

receiving, with the prediction model, one or more of the event input codes and outputting, with the prediction model, one or more probabilities of the first industrial machine transitioning between a first of the machine states to a second of the machine states; and adjusting a state of the first industrial machine based on the one or more probabilities.

15. The method of claim 14, wherein assigning semantic meanings to the machine states is performed by interacting with an expert human user.

16. The method of claim 14, wherein the prediction model is configured to identify state transition probabilities between the machine states.

17. A non-transitory computer-readable medium comprising code configured to cause a computing system comprising one or more computer devices to perform the method of claim 1.

18. A non-transitory computer-readable medium comprising code configured to cause a computing system comprising one or more computer devices to perform the method of claim 10.

19. A computer system comprising one or more processors configured to perform the method of claim 1.

20. A computer system comprising one or more processors configured to perform the method of claim 10.

* * * * *